United States Patent
Sharifi Mehr et al.

(10) Patent No.: US 10,164,997 B2
(45) Date of Patent: *Dec. 25, 2018

(54) SECURITY VERIFICATION BY MESSAGE INTERCEPTION AND MODIFICATION

(71) Applicant: Amazon Technologies, Inc., Seattle, WA (US)

(72) Inventors: Nima Sharifi Mehr, Vancouver (CA); Christopher Dunn, Seattle, WA (US); Alexis Floyd, Seattle, WA (US); David James Kane-Parry, Seattle, WA (US); Volker Helmut Mosthaf, Seattle, WA (US); Christopher Gordon Williams, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/422,253

(22) Filed: Feb. 1, 2017

(65) Prior Publication Data
US 2017/0149817 A1     May 25, 2017

Related U.S. Application Data

(63) Continuation of application No. 14/490,445, filed on Sep. 18, 2014, now Pat. No. 9,571,465.

(51) Int. Cl.
*H04L 29/06*     (2006.01)
*H04L 29/08*     (2006.01)
(Continued)

(52) U.S. Cl.
CPC ....... *H04L 63/1433* (2013.01); *G06Q 10/083* (2013.01); *G06Q 20/405* (2013.01);
(Continued)

(58) Field of Classification Search
CPC ..... H04L 63/00; H04L 63/08; H04L 63/0435; H04L 67/10; H04L 41/02; H04L 41/5064;
(Continued)

(56) References Cited

U.S. PATENT DOCUMENTS 7,320,114 B1   1/2008 Jain et al.
7,383,168 B2 * 6/2008 Mukherjee ....... G01R 31/31704
                                                   703/13
(Continued)

FOREIGN PATENT DOCUMENTS

GB         2516050 A      1/2015

OTHER PUBLICATIONS

Dierks et al., "The TLS Protocol Version 1.0," Request for Comments 2246, Jan. 1999, 75 pages.
(Continued)

*Primary Examiner* — Don G Zhao
(74) *Attorney, Agent, or Firm* — Davis Wright Tremaine LLP

(57) ABSTRACT

A first computer is selected for testing. Information sent from a second computer system to the first computer is intercepted. The information is modified to be noncompliant with a communication protocol, thereby producing noncompliant information. A determination is made whether the first computer device has failed to provide a particular response to receipt of the noncompliant information, and an operation is performed based at least in part on the determination.

20 Claims, 9 Drawing Sheets

(51) Int. Cl.
*G06Q 10/08* (2012.01)
*G06Q 20/40* (2012.01)
*H04L 9/32* (2006.01)

(52) U.S. Cl.
CPC ........ *H04L 9/3268* (2013.01); *H04L 63/0428* (2013.01); *H04L 63/101* (2013.01); *H04L 63/1441* (2013.01); *H04L 63/1483* (2013.01); *H04L 67/10* (2013.01); *H04L 63/08* (2013.01); *H04L 2209/26* (2013.01); *H04L 2209/56* (2013.01)

(58) Field of Classification Search
CPC . H04L 41/5096; H04L 43/04; H04L 63/0428; H04L 63/1441; H04L 63/1483; H04L 63/1433; H04L 63/101; H04L 9/3268; H04L 2209/26; H04L 2209/56; G06F 9/445; G06Q 20/405; G06Q 10/083
See application file for complete search history.

(56) References Cited

U.S. PATENT DOCUMENTS

| | | | |
|---|---|---|---|
| 7,904,518 B2 | 3/2011 | Marino et al. | |
| 8,874,966 B1* | 10/2014 | Garrett, Jr. | G06F 11/3672 709/224 |
| 9,276,952 B2 | 3/2016 | Simpson et al. | |
| 9,479,922 B2* | 10/2016 | Borggaard | H04W 4/008 |
| 2003/0236844 A1* | 12/2003 | Kaler | G06F 11/36 709/206 |
| 2004/0184605 A1* | 9/2004 | Soliman | H04L 9/0822 380/44 |
| 2006/0184707 A1* | 8/2006 | Lesartre | H04L 1/241 710/306 |
| 2007/0074169 A1* | 3/2007 | Chess | G06F 21/54 717/126 |
| 2007/0121596 A1 | 5/2007 | Kurapati et al. | |
| 2008/0043760 A1* | 2/2008 | Venkatraman | H04L 12/4641 370/401 |
| 2008/0089435 A1* | 4/2008 | Torrubia | G06F 21/10 375/295 |
| 2008/0295081 A1* | 11/2008 | Albot | G06F 11/3688 717/128 |
| 2009/0225669 A1* | 9/2009 | Qin | H04L 43/0864 370/249 |
| 2010/0262840 A1* | 10/2010 | Benteo | H04L 9/004 713/190 |
| 2010/0287535 A1* | 11/2010 | Kim | G06F 11/3688 717/127 |
| 2011/0138192 A1* | 6/2011 | Kocher | G06F 21/602 713/189 |
| 2011/0271115 A1* | 11/2011 | Adams | H04L 63/0823 713/176 |
| 2013/0007531 A1* | 1/2013 | Jibbe | G06F 11/1004 714/42 |
| 2013/0132690 A1* | 5/2013 | Epstein | G06F 12/1416 711/159 |
| 2013/0166271 A1* | 6/2013 | Danielsson | G06F 11/3664 703/22 |
| 2013/0173918 A1* | 7/2013 | Saraswat | H04L 63/08 713/167 |
| 2014/0053024 A1* | 2/2014 | Kumar | G06F 17/30339 714/32 |
| 2014/0101332 A1* | 4/2014 | Lipman | H04L 47/283 709/235 |
| 2014/0112339 A1* | 4/2014 | Safranek | G06F 12/0831 370/389 |
| 2014/0173729 A1* | 6/2014 | Cappos | H04L 63/168 726/22 |
| 2014/0304415 A1* | 10/2014 | Prakash | H04L 47/70 709/226 |
| 2014/0337614 A1* | 11/2014 | Kelson | H04L 63/168 713/152 |
| 2016/0014077 A1* | 1/2016 | Plotnik | G06F 21/554 726/11 |
| 2017/0103211 A1* | 4/2017 | Madou | G06F 21/577 |

OTHER PUBLICATIONS

Dierks et al., "The Transport Layer Security (TLS) Protocol Version 1.2," Request for Comments 5246, Standards Track, Aug. 2008, 98 pages.

Eronen et al., "Pre-Shared Key Ciphersuites for Transport Layer Security (TLS)," Request for Comments 4279, Dec. 2005, 16 pages.

McGrew et al., "Datagram Transport Layer Security (DTLS) Extension to Establish Keys for the Secure Real-time Transport Protocol (SRTP)," Request for Comments 5764, May 2010, 27 pages.

Phelan, "Datagram Transport Layer Security (DTLS) over the Datagram Congestion Control Protocol (DCCP)," Request for Comments 5238, May 2008, 11 pages.

Rescorla et al., "Datagram Transport Layer Security Version 1.2," Request for Comments 6347, Jan. 2012, 33 pages.

Tuexen et al., "Datagram Transport Layer Security (DTLS) for Stream Control Transmission Protocol (SCTP)," Request for Comments 6083, Jan. 2011, 10 pages.

Turner et al., "Prohibiting Secure Sockets Layer (SSL) Version 2.0," Request for Comments 6176, Mar. 2011, 4 pages.

* cited by examiner

SECURITY VERIFICATION BY MESSAGE INTERCEPTION AND MODIFICATION

CROSS-REFERENCE TO RELATED APPLICATIONS

This application is a continuation of U.S. patent application Ser. No. 14/490,445, filed Sep. 18, 2014, entitled "SECURITY VERIFICATION BY MESSAGE INTERCEPTION AND MODIFICATION" which is incorporated by reference for all purposes.

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

Many techniques have been developed to enhance data security. However, with large distributed systems, different people may have different roles and different skills with respect to development of and maintenance of applications executing in the distributed systems. With a distributed system employing many different types of applications, each with its own role, ensuring the security of data accessible to the various applications can be a challenge. In many examples, insecurities introduced into an application, whether maliciously or inadvertently, can be difficult to detect. For example, an application with code having an insecure feature (e.g., an improper implementation of a secure communications protocol) may nevertheless operate in accordance with its primary purpose, providing no indication of the insecurity that is present.

BRIEF DESCRIPTION OF THE DRAWINGS

Various embodiments in accordance with the present disclosure will be described with reference to the drawings, in which.

DETAILED DESCRIPTION

Figure 1:
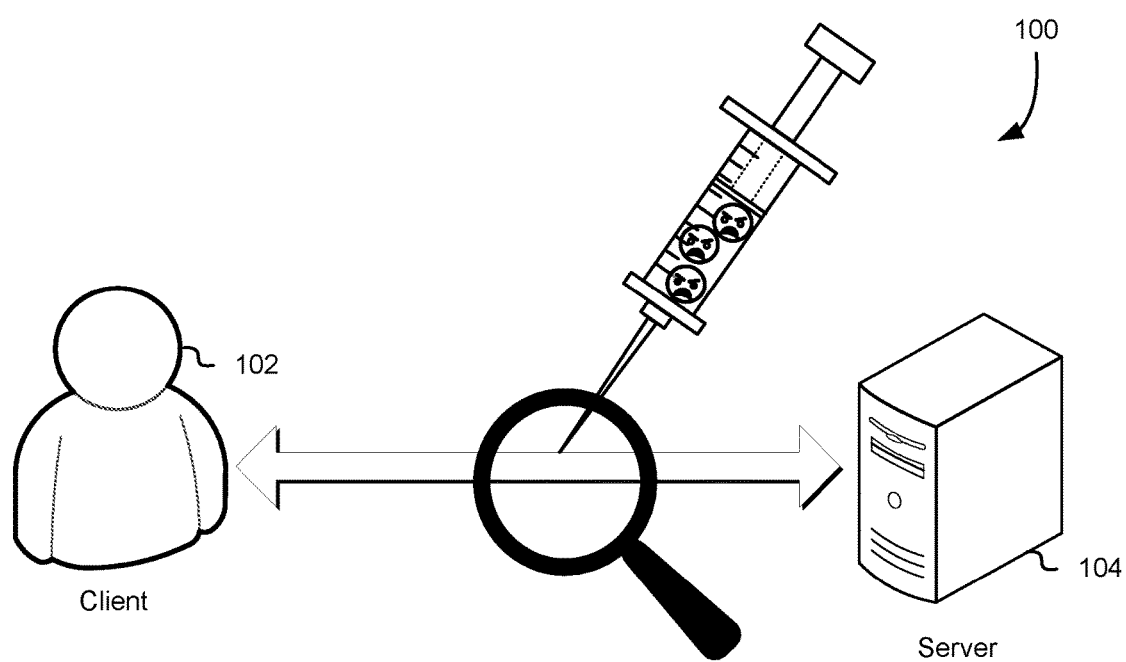
FIG. 1 shows a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include injecting insecurity into communications to test computer systems to detect potential vulnerabilities to data security, enabling such vulnerabilities to be addressed. In an embodiment, a client and a server communicate with one another using a secure communications protocol, such as transport layer security (TLS) or secure sockets layer (SSL). Insecurity is injected into communications transmitted in accordance with the protocol to detect whether a computer system is configured with a faulty implementation of the secure communications protocol. The insecurity may be injected by modifying messages from one computer system to the other to determine how a recipient operates upon having received the modified message(s). Modifications may be made to introduce an error or other manner of noncompliance into messages. As an example, a digital certificate may be modified to be invalid or replaced with an invalid certificate. Whether the computer system that receives the invalid certificate continues operating as if the certificate is valid indicates whether the computer system operates securely, at least with respect to a particular manner of handling a digital certificate.

The way by which insecurity is injected into communications may vary in accordance with various embodiments. For example, in some examples, a computer system in a communications path between two computer systems may operate as a man-in-the-middle. The man-in-the-middle may selectively modify messages passing through the man-in-the-middle for the purpose of testing the system(s) to which the messages are addressed. When the man-in-the middle modifies a message to a computer system, the man-in-the-middle or another computer system may monitor operation of the computer system to which the message was addressed. For example, the man-in-the-middle may analyze messages from a computer system being tested to determine whether the computer system acted in accordance with a protocol's design, such as whether the computer system allowed a handshake process to complete despite the invalid certificate. In some examples, the man in the middle selectively causes messages to not be delivered (i.e., blocks the messages) as a way of injecting insecurity.

In some examples, a network firewall is equipped with an extension (e.g., a programming module) that regularly injects insecurity into a limited number of connections between two network endpoints (e.g., connected with an SSL/TSL connection) and introduces insecurity on the channel. This introduced insecurity can be in the form of injecting or tampering with protocol messages in a connection. This firewall extension may, for example, periodically (i.e. every 2 hours) manipulate one of these connections and act as a man-in-the-middle. For example, the extension may use an invalid certificate while spoofing one of the endpoints. If the endpoint continues to send messages on the connection, one or more mitigating operations may be performed, such as by transmitting a notification or storing data that indicates that the endpoint should be audited.

In other examples, a first computer system monitors a second computer system with which the first computer system communicates without a separate man-in-the-middle injecting the insecurity. As an illustrative example, a client may initiate a TLS handshake with a server (e.g., by transmitting a Client Hello message to the server) and, to test the client, the server may respond to the initiation of the handshake by providing an invalid certificate. If the client allows the TLS handshake to complete successfully (an indication that the client is not properly authenticating server certificates), the server may perform one or more mitigating operations, such as by blacklisting the client, transmitting a message to cause other servers in a fleet to blacklist the client, transmitting a notification, adding a record to a log, and/or performing other operations. If, however, the client rejects the invalid server certificate, the server may simply continue operations as normal or may perform additional operations, such as by adding the client to a temporary whitelist (which may be shared by multiple servers in a fleet). When the client retries connection, starting with the TLS handshake, the server may then provide a valid server certificate (e.g., because the client is on the temporary whitelist) and communicate with the client normally. The whitelist may operate as a cache where items are expired and removed from the list so that the client may then again be tested at a later time.

In some examples, customer computer systems of a service provider are tested in accordance with techniques described herein. Various mitigating operations may be performed in connection with the accounts of customers of the service provider. In an electronic commerce environment, for example, a mitigating operation may result in a limit to an amount (e.g., measure in currency) the customer is allowed to purchase over a time period (e.g., a day). As another example, a mitigating operation may result in limited payment options, such as a reduced set of payment (e.g., credit) cards the customer is able to use. As yet another example, a mitigating operation may result in physical items only being shippable to a certain set of addresses (e.g., an address verified as a home address). As yet another example, fraud detection systems of a service provider may be notified to change fraud detection thresholds to be lower. In some embodiments, a mitigating operation causes a service provider computer system to limit one or more types of information that the customer (through a respective customer computer system) is requested to provide. For instance, the service provider computer system may avoid requesting information classified as sensitive, such as a social security number, credit card number, password, and/or other information.

In some examples, a browser application (e.g., via a browser plugin application) of a client/customer computer system tests servers of a service provider, such as servers of an electronic commerce system. The application may cause the client to limit web page functionality when the application detects an improper server response to an insecurity injection. For example, the application may allow browsing of an electronic catalogue of an electronic commerce system, but may limit the ability to provide sensitive information by, for instance, disabling whole pages, disabling credit card and/or social security number fields, and/or by disabling user interface elements for completing a transaction (e.g., "buy" buttons). Such an application may analyze (e.g., via a rules engine) web pages to determine which functionality to disable. In some examples, the service provider uses a marker in a uniform resource locator (URL) or in the content of the webpage itself to indicate to the client pages which may involve the transfer of sensitive information to enable the client to disable functionality. In some examples, the application has access to a local and/or remote registry of pages (which may be indexed by URLs) to determine which pages may warrant disabled functionality.

Other variations are also considered as being within the scope of the present disclosure. For example, the type of application which applies (which, when executed by one or more processors, causes a computer to apply) a test to another computer system may vary. As noted, a server application, a man-in-the-middle application, or a browser application may apply tests to other computer systems. As another example, a password manager application may be configured to apply tests and/or to obtain the results of applied tests. The password manager may, for instance, be configured to avoid inserting a password into a password field for a web page provided by a server that failed a test or, to require additional operations to be performed (e.g., the navigation through one or more additional prompts) before a password is inserted. Other applications may also include functionality described herein and explicitly mentioned applications are provided for the purpose of illustration.

FIG. 1 shows a diagram illustrating various aspects of the present disclosure. As illustrated in FIG. 1, a client 102 communicates with a server 104. The client 102 may be a computer system operating in accordance with a client application such as a browser application or a mobile application. The client may be any type of computer system configured to communicate over a network in accordance with a communication protocol that may be used to test computer systems in accordance with techniques described herein. Example clients include notebook or desktop computer systems, mobile devices such as mobile phones, table computer systems and electronic book readers and wearable computing devices such as smart watches or smart glasses. Other devices, such as those described below, may also be suitable client devices in some embodiments. Similarly the server may be a computer system implementing one or more server applications that enable the server 104 requests submitted by the client 102. The client 102 and server 104 may communicate over a network such as the internet or a mobile communications network or a combination of networks.

Further, as discussed in more detail below, the client 102 and the server 104 may communicate using various communications protocols including protocols for establishing secure communications channels between the client 102 and the server 104. A secure communications channel may be a mode of communication between two (or among more than two) computer systems where each entity is operable to encrypt messages such that another entity to which the encrypted messages are transmitted is operable to decrypt the messages. An example of a secure communications channel is a TLS session negotiated using a TLS handshake. While various examples of the present disclosure use pairs of devices communicating with one another for the purpose of illustration, secure communications channels may be established in groups of devices where the number of devices is greater than two. The techniques described herein may thusly be adapted by providing the entities the information that enables employment of techniques described herein. In some embodiments, a TLS protocol, such as defined in Request for Comments (RFC) 5246, RFC 2246, RFC 4279, RFC 6347, RFC, 5238, RFC 6083, RFC 5764 and RFC 6176, which are incorporated herein by reference, is used to establish a secure channel. Other protocols such as secure sockets layer (SSL), Internet Protocol Security (IPSec), Secure Shell (SSH) and other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, and other protocols, such as protocols for secure communication that include a handshake.

As illustrated by the syringe in FIG. 1, the techniques of the present disclosure involve the injection of insecurity into communications between the client 102 and the server 104. In some examples, insecurity is injected into the communications between the client 102 and the server 104 for the purpose of testing the client 102 or the server 104. Insecurity may be injected into communications between the client 102 and the server 104 in various ways, in accordance with various embodiments, many examples of which are discussed in more detail below. In some examples, insecurity is injected into the communications between the client 102 and the server 104 by modifying messages transmitted between the client 102 and the server 104. The messages modified may depend on the system being tested. For example, if the client 102 is being tested, messages from the server 104 to the client 102 may be transformed to test the response of the client 102 to the message that has been modified. Similarly, if the server 104 is being tested, a message from the client 102 may be modified to test the server's response to the modification. In some examples, messages are modified to test whether a computer system operates in a secure manner, where operation in a secure manner may be determined by determining whether the computer system operates in accordance with a protocol's design and/or in accordance with one or more security policies. In some examples, a message between the client 102 and the server 104 is modified so as to fail to comply with a secure communications protocol, such as TLS used by the client 102 and the server 104 to communicate over a secure channel.

A behavior of the entity (client 102 and the server 104) receiving the modified message may be monitored to determine whether that entity operates in a secure manner when messages fail to comply with the secure communication protocol. In other examples, additional messages (i.e., messages whose primary purpose is testing and that would not otherwise be transmitted) are transmitted for the purpose of testing the behavior of an entity receiving the message. For example, a message may be configured to fail to comply with the secure communications protocol and transmitted to the client 102. The message may originate from a computer system different from the server 104, but may be configured with a source network address (e.g., source Internet Protocol (IP) address) of the server 104. Generally, insecurity is purposefully injected into the communications between the client 102 and the server 104 for the purpose of testing the client 102 and the server 104, and the manner by which insecurity is injected may vary in accordance with various embodiments.

As discussed in more detail below, insecurity may be injected into communications between the client 102 and the server 104 at the direction of the client 102, at the direction of the server 104, or at the direction of another entity such as another computer system not illustrated in FIG. 1. While FIG. 1 shows, for the purpose of illustration, a client and server relationship, it should be noted that the techniques described here are applicable to a wide variety of computing environments including communications between computer systems that may not be classified as clients or servers, but generally computer systems that communicate with each other as part of their operations.

Figure 2:
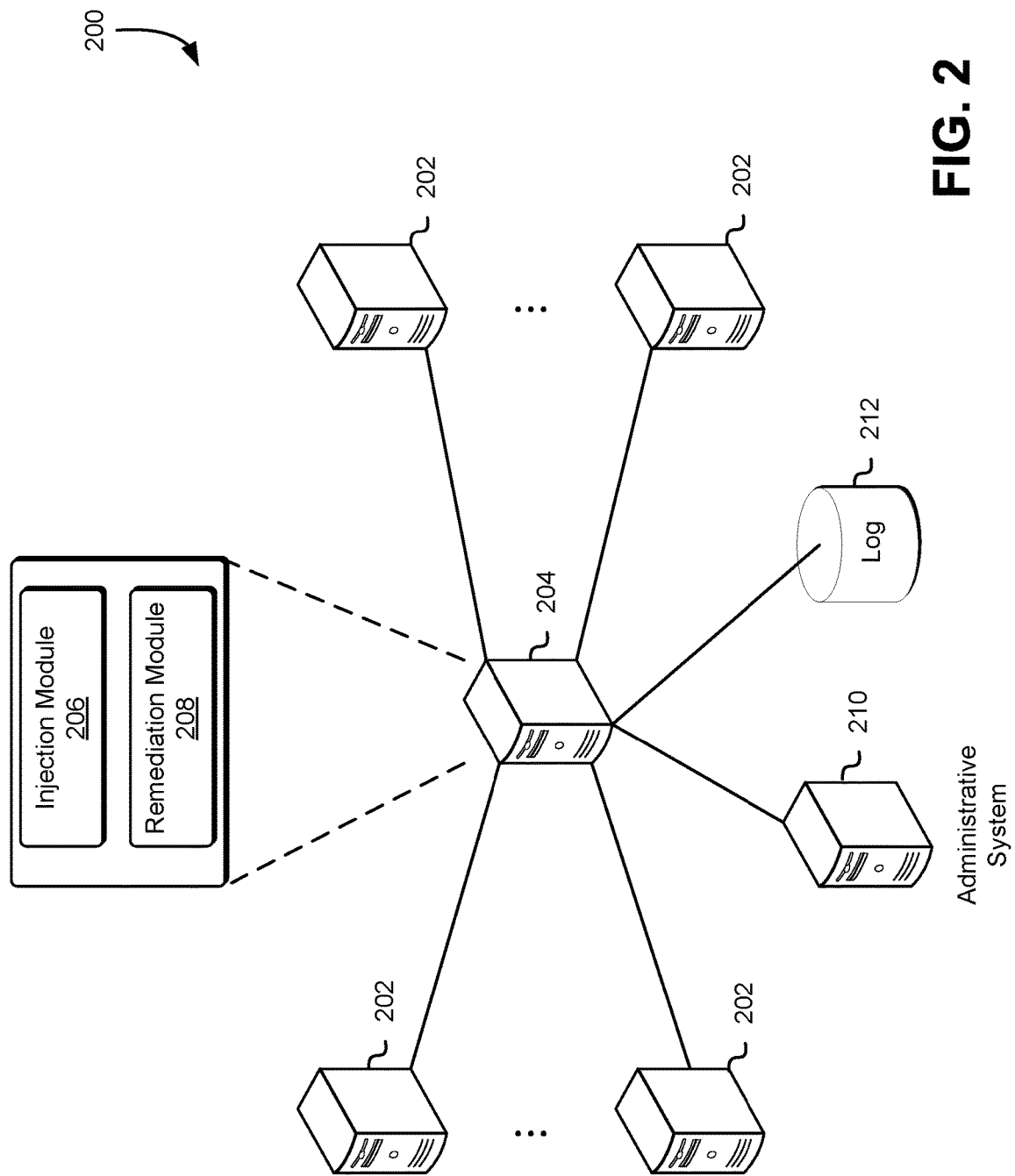
FIG. 2 shows an illustrative environment in which various embodiments can be practiced.

FIG. 2 shows and illustrative example of an environment 200 in which various embodiments can be implemented. As discussed in more detail below, in the environment 200 illustrated in FIG. 2, a computer system acts as a man-in-the-middle in order to test computer systems that communicate in a network. A man-in-the-middle may be a computer system or application executing on a computer system that injects insecurity into communications between computer systems in a manner such that, when a message from a first computer system to a second computer system is modified (e.g., replaced) by the man-in-the-middle, the message indicates (e.g., by a source IP address and/or other information, such as one or more additional fields of the message) that the message originated from the first computer system. In this manner, the second computer system operates as if the modified message originated from the first computer system.

As illustrated in FIG. 2, the environment 200 includes a plurality of computer systems 202. The computer system 202 may be a client computer system or a server system or generally any computer system configured to communicate over a network and to which techniques described herein may be applicable. In some examples, the computer systems 202 are part of a distributed computer system, such as a distributed system that supports an electronic commerce website or other service. Some computer systems 202 may implement services of the distributed system related to operations of the website. Other computer systems 202 may consume services provided by other computer systems 202. In reference to FIG. 9 discussed below, one computer system 202 may be a web server and another computer system 202 may be an application server as part of providing a website. The web server may communicate with the application server to determine information to be provided on a web page served by the web server. Other examples are also considered as being within the scope of the present disclosure, including, generally, computer systems 202 that play different roles in different contexts.

As noted above, various embodiments of the present disclosure utilize a man-in-the-middle model to test computer systems that communicate in a network. Testing may be performed, for example, to ensure that nodes in a distributed system operate in accordance with one or more data security policies and, therefore, operate in a manner that maintains the security of customer data. As illustrated in FIG. 2, the environment 200 may include a man-in-the-middle computer system 204 which may be the computer system in a network path between the computer systems 202. The man-in-the-middle computer system 204 may be implemented in various ways in accordance with various embodiments. In some examples, a man-in-the-middle computer system 204 may be implemented as a firewall or other routing device in network over which the computer systems 202 communicate. As yet another example, the man-in-the-middle computer system 204 may be implemented using a Wi-Fi access point that is a computer system. A computer system operating a Wi-Fi access point may also operate as a man-in-the-middle. Generally, the man-in-the-middle computer system 204 may be implemented by any capable computing device through which communications between pairs of computer systems 202 are routed. It should be noted that while FIG. 2 shows an environment 200 with a single man-in-the-middle computer systems 204, large computer networks may include multiple man-in-the-middle computer systems 204 for the purpose of scalability and to provide the ability to test computer systems without creating network bottleneck through man-in-the-middle computer system 204.

As illustrated in FIG. 2, the man-in-the-middle computer system 204 may include various applications that include executable code that when executed by the man-in-the-middle computer system 204 causes the man-in-the-middle computer system 204 to implement various techniques described herein. For example, as Illustrated in FIG. 2, the man-in-the-middle computer system 204 may include an injection module 206 and a remediation module 208. The injection module 206 may comprise executable code that when executed by the man-in-the-middle computer system 204 causes the man-in-the-middle computer system 204 to inject insecurity into communications between pairs of computer systems 202 in order to test a computer system 202 of the pair. The injection module 206 may be configured, for example, to cause the man-in-the-middle computer system 204 to intercept messages that modify those messages to fail to comply with a secure communications protocol (e.g., by introducing an erroneous result of a cryptographic computation) or to otherwise inject insecurity into communications between the pair of computer systems 202.

The remediation module 208 may comprise executable code that when executed by the man-in-the-middle computer system 204 causes the man-in-the-middle computer system 204 to analyze a response of a computer system 202 to the injection of an insecurity into communications to the computer system 202 and to perform one or more mitigating operations. An example of mitigating operations includes blocking communications to and/or from the computer system 202 that failed to provide responses in a proper manner to the insecurity injection. Other mitigating operations that may be performed in alternative, or in addition to blocking communications, include: transmitting one or more notifications; throttling communications to and/or from the computer system 202; blacklisting the computer system 202 by adding a network address of the computer system 202 to a blacklist; annotating communications from the computer system 202 to indicate to other computer systems a potential insecurity to enable the other computer systems to operate in accordance with having received communications having the flag; quarantining communications from the computer system 202 and/or other operations. Notifications that are transmitted in accordance with various embodiments may provide relevant information, such as an indication of the manner in which a computer system operated insecurely and/or a potential fix (e.g., a software patch) to address the insecure operation. Other operations that may be performed include: performing a scan of the computer system 202 to obtain more information and/or to modify executable code of the computer system 202 in order to cause the computer system 202 to operate in a secure manner. The executable code of the computer system 202 may be modified, for example, by pushing one or more software patches to the computer system 202 or otherwise updating the computer systems 202 operating system applications and/or firmware.

As illustrated in FIG. 2, the environment 200 also includes an administrative system 210. The administrative system 210 may be a computer system with an application that is operable to cause the administrative system 210 to orchestrate operation of the injection module 206 and/or remediation module 208. For example, the administrative system 210 may be configured to provide to the man-in-the-middle computer system 204 configuration data that indicates to the man-in-the-middle computer system 204 the parameters for operation of the injection module 206 and/or remediation module 208. The administrative system 210, for example, may transmit instructions to the man-in-the-middle computer system 204 to test particular computer systems, to provide a list of computer systems to be tested, to provide parameters for the test to be performed and/or otherwise to indicate to the man-in-the-middle computer system 204 how to operate.

The environment 200 may also include a log 212 which may be a data storage system (generally, a data repository) that stores data related to the operation of the man-in-the-middle computer system 204. For instance, in some examples the man-in-the-middle computer system 204 injects insecurity into communications to one or more computer systems 202 and communications from the one or more computer systems 202 being tested are stored in the log 212. The administrative computer system 210 or another computer system may consume (e.g., process by analyzing) logs in the log 212 to asynchronously process the logs to determine whether the one or more computer systems 202 being tested are operating securely. The log 212 may also contain other data, such as data relating to the operation of the man-in-the-middle computer system 204 and its operations, such as, instances of insecurity injection performed by the man-in-the-middle computer system 204 and responses thereto by computer systems 202.

Figure 3:
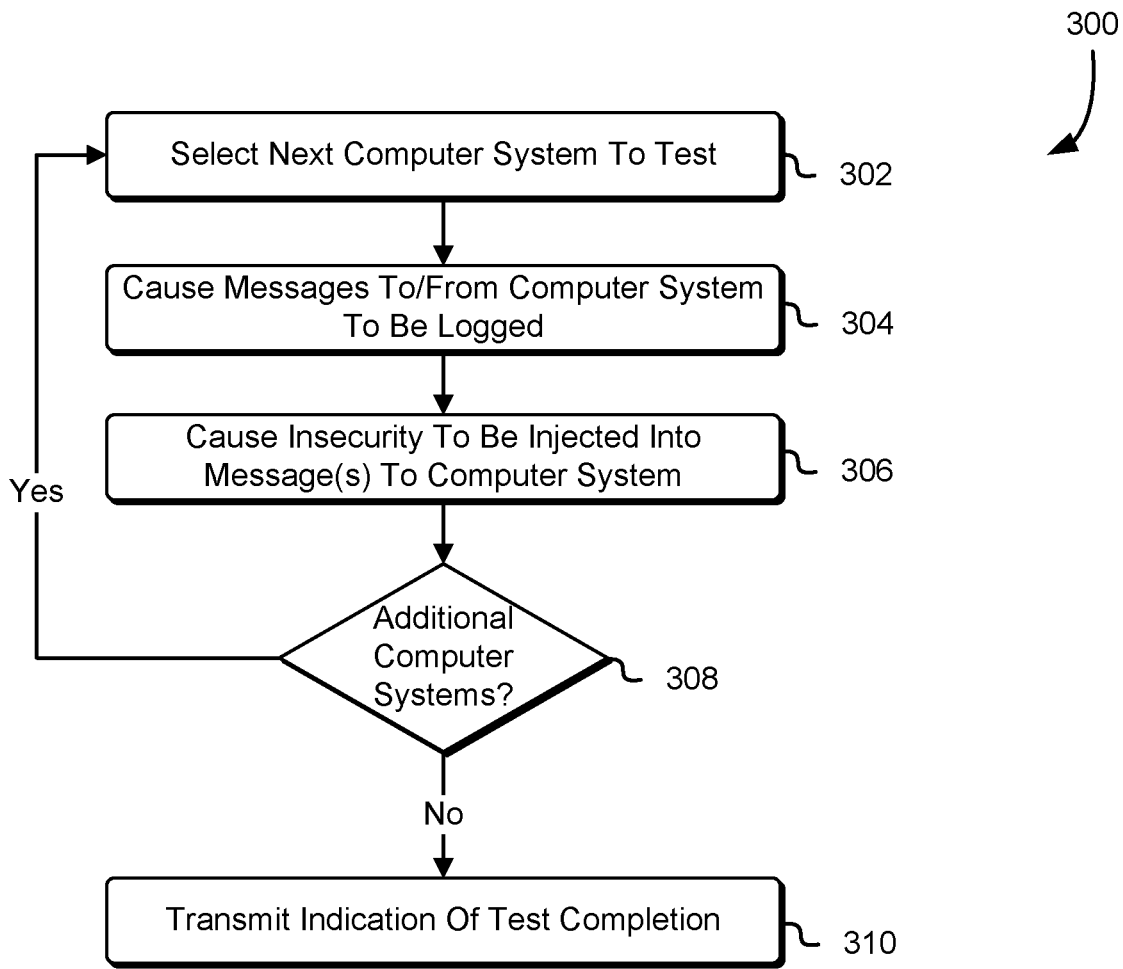
FIG. 3 shows an illustrative example of a process protesting a set of computer systems in accordance with an embodiment.

FIG. 3 shows an illustrative example of a process 300 for testing computer systems in accordance with an embodiment. The process 300 may be performed by any suitable system, such as by a man-in-the-middle computer system described above in connection with FIG. 2 or an administrative computer system 210. It should be noted, however, that the process 300 may be performed by other systems which do not necessarily operate as a man-in-the-middle. For example, any system that communicates with other computer systems may perform the process 300 to test the other systems. In a specific example, a server may be configured with executable instructions for testing clients and, as part of testing clients, may perform the process 300. As another specific example, a client may be configured with executable instructions for testing servers and, as part of testing servers, may perform the process 300.

In some embodiments, the process 300 is performed as a result of various events happening. For example, the process 300 may be performed as a result of an instruction to perform with the process 300 from an administrative computer system such as described above. The instruction or other information may be provided to a system performing the process 300 to cause the system performing the process 300 in accordance with parameters that have been provided. The parameters may, for example, specify computer systems to be tested and/or the manner by which they are to be tested.

Turning to the specifics of the example embodiment illustrated in FIG. 3, the process 300 may include selecting 302 a next computer system to test. The next computer system to test may be the first computer system in a list of computer systems to be tested by a system performing the process 300. It should be noted, however, that the computer system to test may be selected in other ways in accordance with the various embodiments. For example, in some embodiments a computer system is selected in a random manner. As another example, a computer system may be tested as a result of being a computer system from which a system performing the processing 300 has most recently received a communication. Generally, any way by which a computer system may be selected may be used.

Once a computer system to test has been selected 302, the process 300 may include causing 304 messages to and from the computer system to be logged. The manner by which messages to and from the computer system are caused to be logged may vary in accordance with various embodiments. In some examples, a system performing the process 300 stores messages to and from the computer system locally and causes messages to and from the computer system to be logged by updating a table or other data structure that indicates to the system performing the process 300 to log messages that it receives to and/or from the computer system that was selected to be tested. In other examples, a system performing the process 300 logs messages in a remote data store such as a log discussed above in connection with FIG. 2. In such examples, a system performing the process 300 may update a table or other data structure to indicate to the system to log messages to and/or from the computer system selected to be tested. In yet another example, in some embodiments, a system different from the system performing the process 300 (e.g., one or more other computer systems in one or more network paths through which the messages may pass) may be configured to log messages to and/or from the computer selected to be tested. In such embodiments, causing messages to and/or from the computer system to be logged may be performed by transmitting an instruction to another computer system (or multiple computer systems) through which communication may pass on route to or from the computer system that was selected for testing to thereby cause that other computer system to log messages to and/or from the computer system selected for testing.

The process 300 may also include causing 306 insecurity to be injected into one or more messages to the computer system that was selected 302 for testing. As discussed above, the security may be caused to be injected into one or more messages by modifying the one or more messages to fail to comply with a secure communications protocol.

In some embodiments a system different from the system performing the process 300 injects insecurity into one or more messages to the computer that was selected 302 for testing. As an illustrative example, in reference to FIG. 2, in embodiments where the administrative computer system 210 performs the process 300, the administrative computer system 210 may send an instruction to the man-in-the-middle computer system 204 to cause the man-in-the-middle computer system 204 to inject insecurity into one or more messages to the administrative computer system 210.

A determination may be made 308 whether there are additional computer systems to test. For example, in embodiments where a list of computer systems is processed, a determination may be made 308 whether there are additional computer systems in the list to be tested. The determination 308 whether there are additional computer systems may also be performed in other ways, such as by determining a number of computer systems that have been tested and whether that number has made a threshold number of computer systems to test or otherwise. If it is determined 308 that there are additional computer systems to test, the process 300 may include selecting 302 the next computer system to test. As discussed above, the next computer system may be selected 302 as a next in the list or otherwise, such as randomly.

The process as described above may repeat as illustrated in FIG. 3 until it is determined 308 that there are no additional computer systems to test. When it is determined 308 there are no additional computer systems to test, the process 300 may include transmitting 310 an indication of test completion. The indication of test completion may comprise, for example, a message that indicates completion of a test of a plurality of computer systems. The message may be an internal message, such as when the administrative computer systems described above, in connection with FIG. 2, performs the process 300; or, the message may be a message over a network, such as when the man-in-the-middle computer system 204, discussed above in connection with FIG. 2, performs the process 300 and indicates to another computer system, such as the administrative computer system 210, that the test has been completed. Other variations are also considered as being within the scope of the present disclosure.

Figure 4:
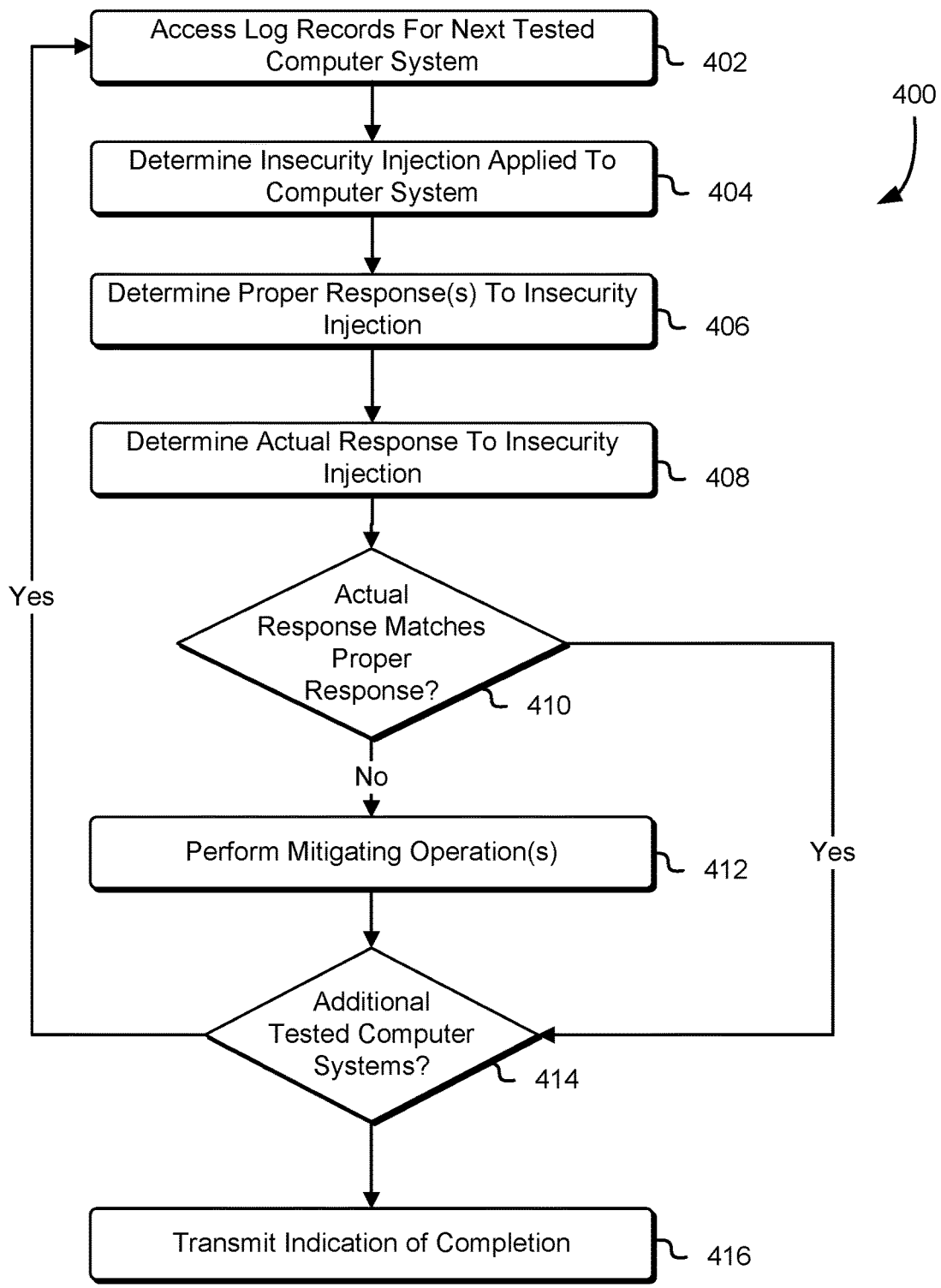
FIG. 4 shows an illustrative example of a process for analyzing test results of tested computer systems in accordance with an embodiment.

As noted above, various embodiments of the present disclosure include asynchronous analysis of responses to injections of insecurity to communications. FIG. 4 accordingly, shows an illustrative example of a process 400 for asynchronously analyzing responses of computer systems that have been tested. The process 400 may be performed by any suitable systems, such as, by an administrative computer system described above in connection with FIG. 2, or generally any computer system configured with executable instructions for performing the process 400. In an embodiment, the process 400 includes accessing 402 log records for a next tested computer system. When the process 400 has initially begun, the next tested computer system may be the first computer system in a list of computer systems that has been tested although, as noted, selection of a computer system for many may be performed in other ways, such as randomly. For example, in large distributed systems where a large number of computer systems have been tested, computer system logs may be selected randomly to obtain an even distribution of systems that are tested at any given time.

From the log records that were accessed 402, the process 400 may include determining 404 an insecurity injection that was applied to the computer system. For example, in some embodiments, a system testing other computer systems may have a plurality of types of insecurity injection that may be applied and the log records may indicate which of the several types was applied. The insecurity injection may be determined 404 also as a default security injection. The process 400 may also include determining 406 a set of proper responses to the insecurity injection that was applied. In some examples, the set of proper responses comprises a single operation (or not performing a certain operation) and performance of (or no performance of) that operation is identified to the computer system performing the process 400 as being a proper response. A table or other data structure may associate types of insecurity injections with sets of proper responses to the insecurity injections so that the system performing the process 400 may reference the table or other data structure to determine 408 the set of proper responses.

The accessed 402 log records may be analyzed to determine 408 an actual response to the insecurity injection. As an illustrative example, if the insecurity injection was presentation of an invalid certificate during a TLS handshake process, the log records may be analyzed to determine 408 whether the tested computer system, nevertheless, allowed the TLS handshake process to complete. As another example, some types of insecurity injections may have a single proper response that includes ceasing communications. Thus, the log records may be analyzed to determine whether communications were ceased by, for example, the absence of log records indicating communication from the tested computer system in the log records that were accessed 402. Generally, any way by which log records may be analyzed to determine the actual response may be used.

Once a system performed the process 400 has determined a set of proper responses and determined 408 the actual response. The process 400 may include determining 410 whether the actual response matches a proper response in the set of proper responses that was determined 406. If it is determined 410 that the actual response matches a proper response in the set of proper responses that was determined 406, the process 400 may include determining 414 whether there are additional computer systems to test and, if so, accessing log records for the next tested computer system such as described above. As noted, the next tested computer system may be a next tested computer system in a list of computer systems that have been tested or may be a tested computer system selected in another manner, such as randomly. The process 400 may repeat, as described above, until it is determined 410 that the actual response of a tested computer system does not match any proper response from the set of proper responses that was determined 406.

When it is determined 410 that the actual response does not match a proper response of a set of proper responses that was determined 406, the process 400 may include performing 412 one or more mitigating operations, such as described above. For example, the tested computer system may be blacklisted and/or other operations may be performed in connection with the computer system that was tested. A determination may be made whether there are additional tested computer systems, such as described above, and the process 400 may repeat, as described above, until it is determined that there are no additional computer systems to test. When it is determined 414 that there are no additional computer systems to test, the process 400 may include transmitting 416 an indication of completion of the process 400. The transmission of an indication of completion may be performed, for example, as an internal communication indicating an end to the process 400 and/or may include transmission of one or more messages over a network to indicate completion of the process 400.

Figure 5:
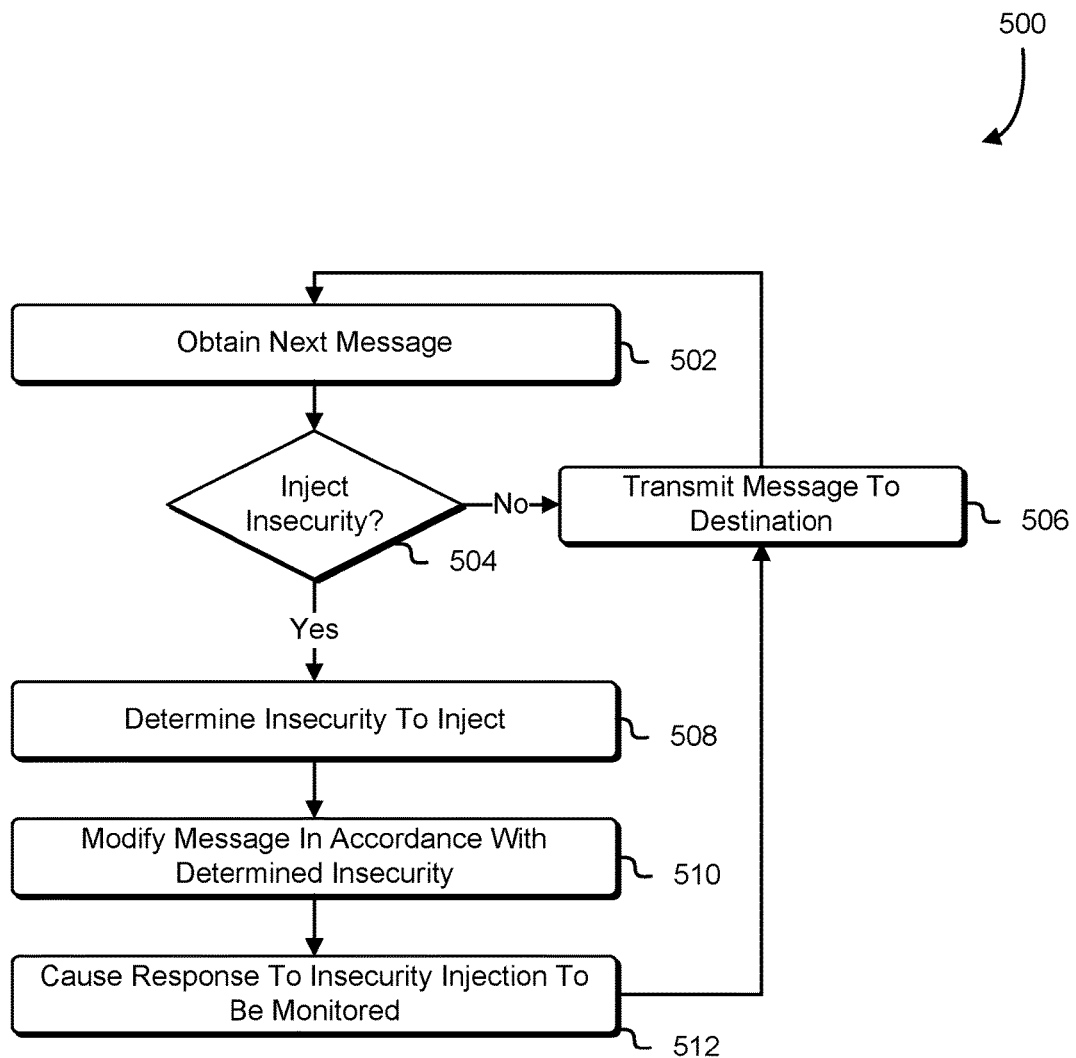
FIG. 5 shows an illustrative example of a process for selectively testing computer systems in accordance with an embodiment.

Various techniques for testing computer systems may be employed in various embodiments of the present disclosure. For example, FIGS. 4 and 5 show a systematic process of testing computer systems and analyzing the results. The manner by which computer systems are tested may vary in various embodiments. FIG. 5 shows an illustrative example of a process 500 for testing computer systems. The process 500 may be performed by any suitable system, such as a man-in-the-middle computer system described above in connection with FIG. 2, or another computer system, such as a computer system that is communicating with another computer system, such as described below in more detail in connection with FIG. 7.

In an embodiment, the process 500 includes obtaining 502 a next message. The next message may be the next message in a queue of messages of the system performing the process 500. For example, when the process 500 is performed by a man-in-the-middle computer system, the man-in-the-middle computer system may queue messages that it receives and process the messages in accordance with an order in the queue. Processing the message may include, for some messages, routing the messages to their destination and/or performing other operations, such as operations of the process 500.

When the next message has been obtained 502 the process 500 may include making a determination 504 whether to inject insecurity. The determination whether to inject insecurity, may be made in various ways, in accordance with various embodiments. In some embodiments a table or other data structure is referenced to determine whether the computer system performing the process 500 has recorded that a computer system corresponding to a destination of the next message that was obtained has been identified for testing. As another example, the determination whether to inject insecurity may be made randomly as part of a process that randomly tests computer systems in order to generally verify secure operation of computer systems in a distributed system. In some embodiments, the determination whether to inject insecurity may be made based, at least in part, on one or more records that indicate whether the computer system to which the message is addressed has already been tested within an amount of time specified as recent. For example, in some embodiments, a server computer system establishes a session with a client computer system. The client computer system and/or server computer system may be tested once per session. The determination 504 when to inject insecurity may be made, at least in part, on whether the message was received as part of the same session for which a test has already been performed. As yet another example, content of the message may be analyzed to determine 504 whether to inject insecurity. For example, in some instances, certain messages of a TLS handshake protocol trigger tests. As an example, a message that includes information indicative of inclusion of a certificate that is provided in accordance with a TLS handshake may trigger a determination 504 to inject insecurity into the message, for example, by modifying the certificate. Other ways by which a determination may be made, including combinations of the above, are considered as being within the scope of the present disclosure.

If it is determined 504 not to inject insecurity, the message may be transmitted 506 to its destination. A next message may be obtained 502 and the process 500 may repeat as described above until it is determined 504 to inject insecurity. When it is determined 504 to inject insecurity, the process 500 may include determining 508 an insecurity to inject. The insecurity to inject may comprise an operation to be performed, on the message, on or otherwise in connection with the message. As noted above, the insecurity may comprise a modification of the message to cause the message to have an error that is out of compliance with a secure communications protocol.

The insecurity to inject may be determined 508 in various ways in accordance with various embodiments. For example, in some embodiments, a system performing the process is operable to inject different types of insecurities and the process 500 may include randomly or non-randomly selecting an insecurity to inject from the multiple insecurities. As another example, a system performing the process 500 may simply be operable to determine a single insecurity to inject. As a result, the insecurity to object may be determined 508 as a default. As yet another example, as noted above, content of the message may be used to determine 504 whether to inject the insecurity. The specific content that triggered the determination 504 to inject the insecurity may be associated with a type of insecurity to inject. As an example, if a certificate of a TLS handshake triggered the determination 504 to inject the insecurity, the insecurity to inject may be determined as a modification of the certificate. Other ways of determining 508 an insecurity to inject are considered as being within the scope of the present disclosure.

Once the insecurity to inject has been determined 508, the process 500 may include modifying 510 the message in accordance with the determined insecurity. As noted, the message may be modified in various ways in various embodiments, such as by modifying contents of the message to cause the message to cause an error in a proper implementation of a secure communications protocol. In addition to modifying 510 the message in accordance with the determined insecurity, the process 500 may include causing 512 a response to the insecurity injection to be monitored. The response to the insecurity injection may be caused 512 to be monitored in various ways in accordance with various embodiments. In some examples, a table or other data structure is updated to enable the system performing the process 500 or another system performing the monitoring to distinguish messages from the system to which the message is addressed from other messages in order to log the messages and/or information about the messages. As another example, another computer system that performs the monitoring may be instructed to perform the monitoring and the instruction may include information that enables the monitoring to occur, such as a network address of the computer system to which the message was addressed.

The process 500 may also include transmitting 506 the modified message to its destination in order to enable the computer system corresponding to the destination to process the modified message so that its response to the modification may be monitored. The process 500 may repeat as described above as the system performing the process 500 processes network traffic. A system that performs the process 500 or another system may monitor communications from a computer system that was tested by the injection of insecurity.

Figure 6:
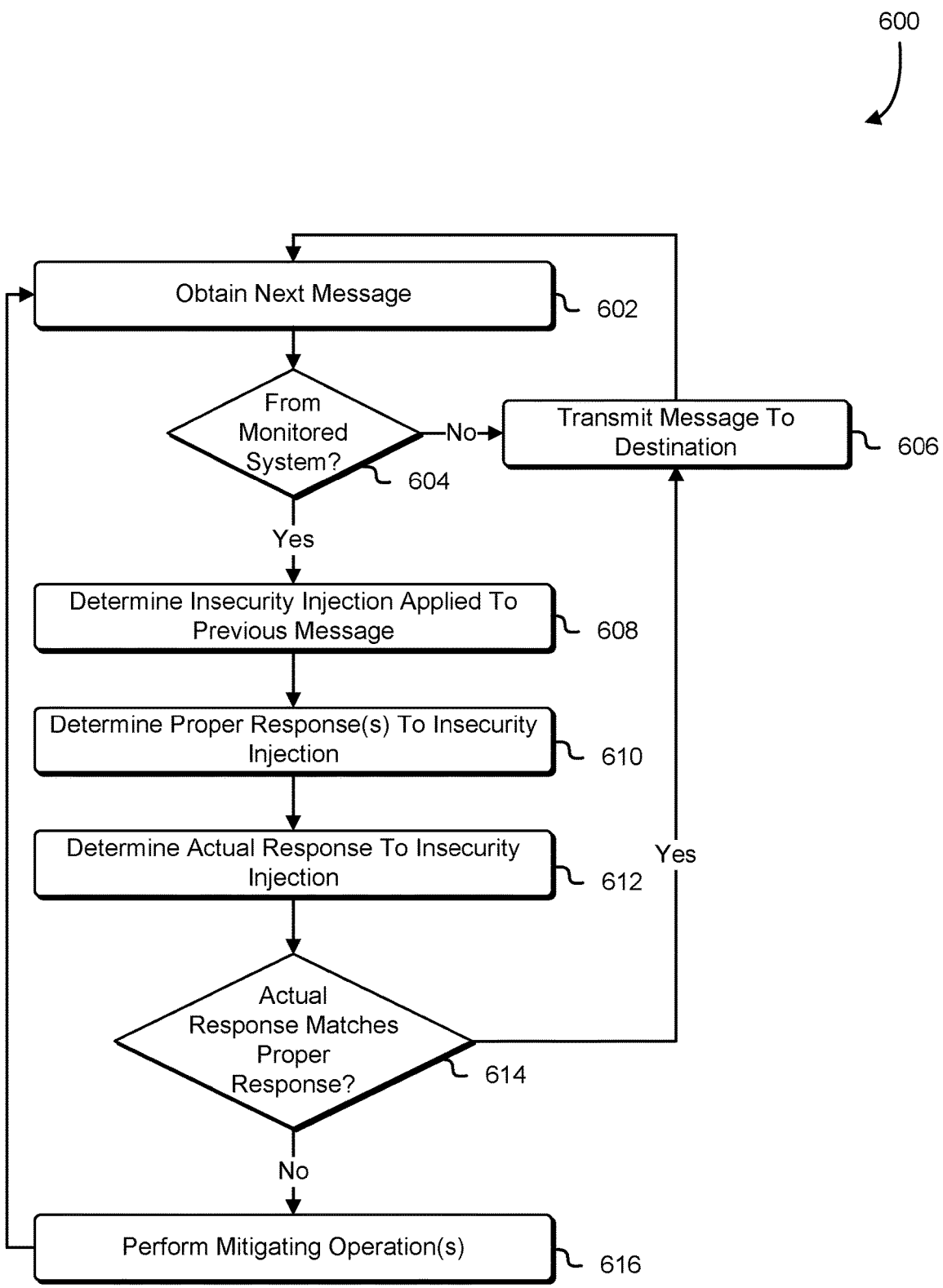
FIG. 6 shows an illustrative example of analyzing communications from tested computer systems in accordance with an embodiment.

FIG. 6 shows an illustrative example of a process 600 for monitoring communications from tested computer systems in accordance with an embodiment. The process 600 may be performed by any suitable system such as the same system that performed the process 500 for another system, such as another system in a network path between a tested computer system and another computer system with which the tested computer system communicates. In an embodiment, a system performing the process 600 obtains 602 a next message. The next message may be obtained, such as described above in connection with FIG. 5. A determination may be made 604 whether the message originated from a system being monitored. A list of network addresses or another mechanism may be used to indicate computer systems being monitored and the determination 604 may be made based at least in part on the list for other data structure.

If it is determined 604 that the message was not from a system being monitored, the process 600 may include transmitting 606 the message to its destination. The process 600 may repeat, as illustrated in FIG. 6, by obtaining 602 a next message and determining whether that next message is from a system being monitored until it is determined 604 that the message currently being processed by performance of the process 600 originated from a computer system being monitored. When it is determined that the message is from a computer system being monitored, the process 600 may include determining 608 an insecurity injection implied to a previous message, such as described above. Further, the process 600 may also include determining 610 a set of proper responses to the insecurity injection that was determined have been applied. The set of proper responses may be determined 610, such as described above.

The message currently being processed by performance of the process 600 may be analyzed to determine 612 an actual response to the insecurity injection by the computer system that originated the message. The actual response may be determined 612, such as described above. A determination may be made 614 whether the actual response matches a proper response from the set of proper responses that was determined 610. The determination 614 whether the actual response matches a proper response may be made, such as described above. If it is determined that the actual response matches a proper response, the process 600 may include transmitting 606 message to its destination and obtaining 602 the next message and the process 600 may repeat, as illustrated in FIG. 6, until it has determined 614 that an actual response to an insecurity injection does not match a set of proper responses that has been determined 610. When it is determined 614 that an actual response to an insecurity injection does not match a proper response with a set of proper responses that has been determined 610, the process may include performing 616 one or more mitigating operations, which mitigating operations may be one or more operations, such as described above. The process 600 may repeat, as illustrated in FIG. 6, as a system performing the process 600 receives and processes messages.

Figure 7:
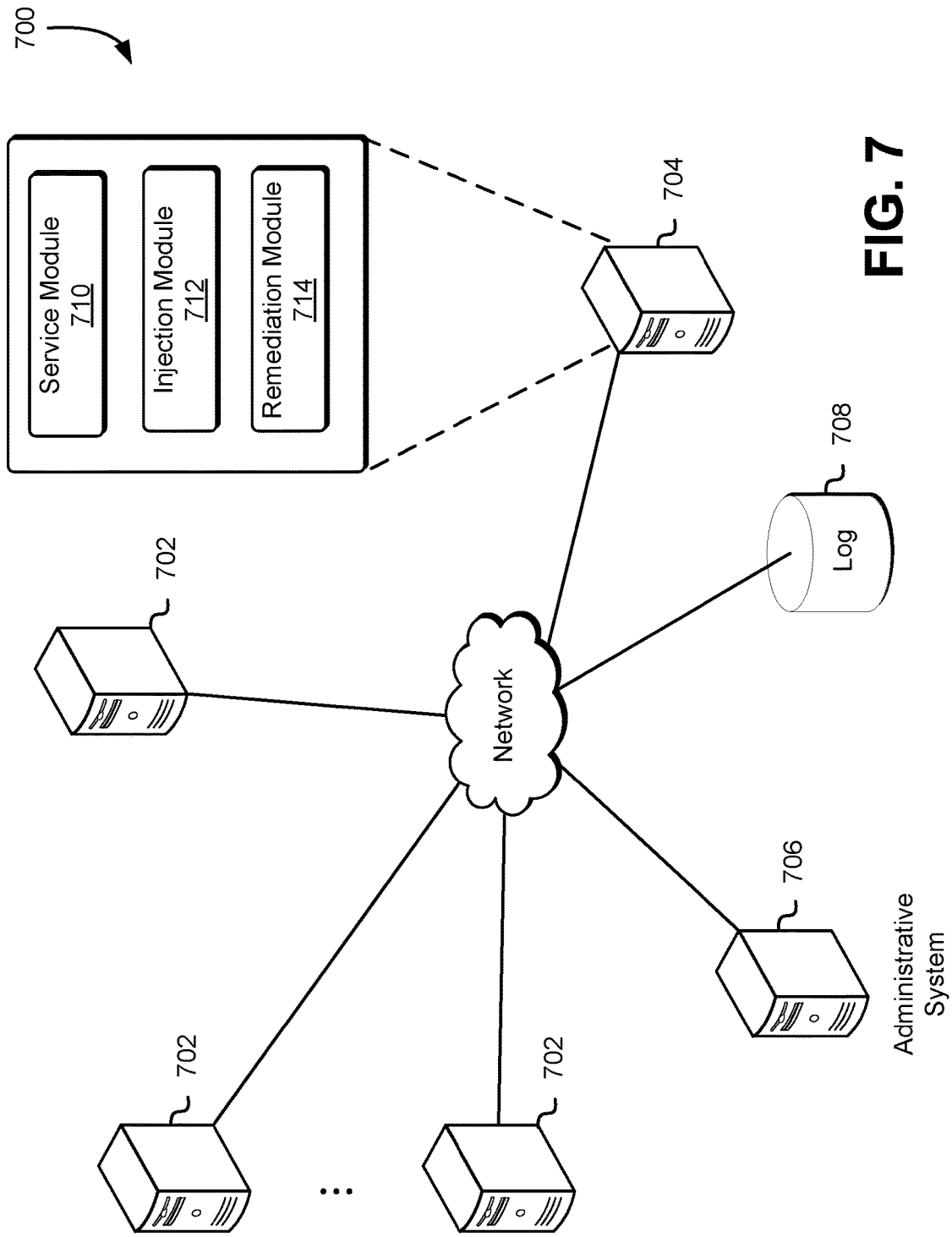
FIG. 7 shows an illustrative example of an environment in which various embodiments can be implemented.

As noted above, the techniques of the present disclosure may be implemented in various ways in accordance with various embodiments. For example, FIG. 2 shows an illustrative environment 200 in which a man-in-the-middle computer system 204 injects insecurity into communications for the purpose of testing computer systems. FIG. 7 shows an alternate example of an environment in which various embodiments can be practiced. In the environment 700 a plurality of computer systems 702 communicate over a network. A computer system 704 may also communicate with one or more computer systems 702. In some examples, the computer system 704 is a server computer system of a service provider, such as a service provider that operates an electronic commerce website and the computer systems 702 of customers of the service provider that utilize the computer system 702 for the purpose of communicating with the service provider. In other examples, a computer system 702 is a server computer system of a service provider and the computer system 704 is a computer system of a customer of the service provider. The computer system 702, 704 may communicate over a network such as the internet or another network or combination networks, such as described above and below. In some embodiments, the environment 700 includes an administrative system 706 and a log 708, such as described above in connection with FIG. 2, although other embodiments and administrative systems 706 and logs 708 may not be present.

In an embodiment, the computer system 704 includes one or more programming modules that, when executed by the computer system 704, cause the computer system 704 to apply various techniques described herein. In the example of FIG. 7, the computer system 704 includes a service module 710, injection module 712, and the remediation module 714. In an embodiment, the service module 710 comprises executable code that when executed by the computer system 704 causes the computer system 704 to provide a service, such as a web service. In some examples, the service module 710 is a web server application. The service module 710 may comprise code for receiving and responding to hypertext transfer protocol (HTTP) requests. It should be noted, however, that the service module 710 may be any type of module that enables the computer system 704 to provide a service, such as an internal service when the computer system 704 is an application server that, from the prospective of the customer of the service provider, is behind a webserver. In other examples, the service module 710 is an application on a customer computing device, such as a browser application or a mobile application that is configured to interact with a service provider computer system where the service provider computer system may be implemented by one of the computer systems 702.

The injection module 712 may comprise executable instructions for injecting insecurity into communications between the computer system 704 and one or more of the computer systems 702. The injection module 712 may cause the computer system 704 to inject insecurity such as described above. Similarly, the remediation module 714 may comprise executable instructions for determining when a computer system 702 has operated insecurely and, as a result, perform one or more mitigating operations, such as described above. The service module 710, injection modules 712, and remediation modules 714 may be configured in various ways in accordance with various embodiments. For example, in some embodiments, the injection module 712 and remediation module 714 are configured to intercept communications from the service module 710. In other words, when the computer system 704 executing the service module 710 generates a message for transmission, the computer system 704 executing the injection module may modify the generated message in order to inject insecurity. The injection module 712 may be configured to be independent of the service module 710, for example, by being configured such that cross module function calls between the service module 710 and injection module 712 do not occur. In some examples, the injection module 712 is a plug-in or a component of a plug-in of a browser application as may be the remediation module 714.

The remediation module 714 may similarly be configured, such as the injection module 712 described above. Operation of the injection module 712 and/or remediation module 714, in some embodiments is in accordance with information provided by the administrative system 706, such as described above in connection with FIG. 2. Similarly, operation of the computer system 704 in connection with execution of the injection module 712 and the remediation module 714 may cause messages and/or information about messages to be stored in the log 708. As another example in which the service module 710, injection module 712, and remediation module 714 may be implemented, the service module 710 may be an application operating in a guest domain of a hypervisor of a virtualization platform. The injection module 712 and/or remediation module 714 may operate in another domain, such as a privileged domain of the hypervisor. Other examples are also considered as being within the scope of the present disclosure.

Figure 8:
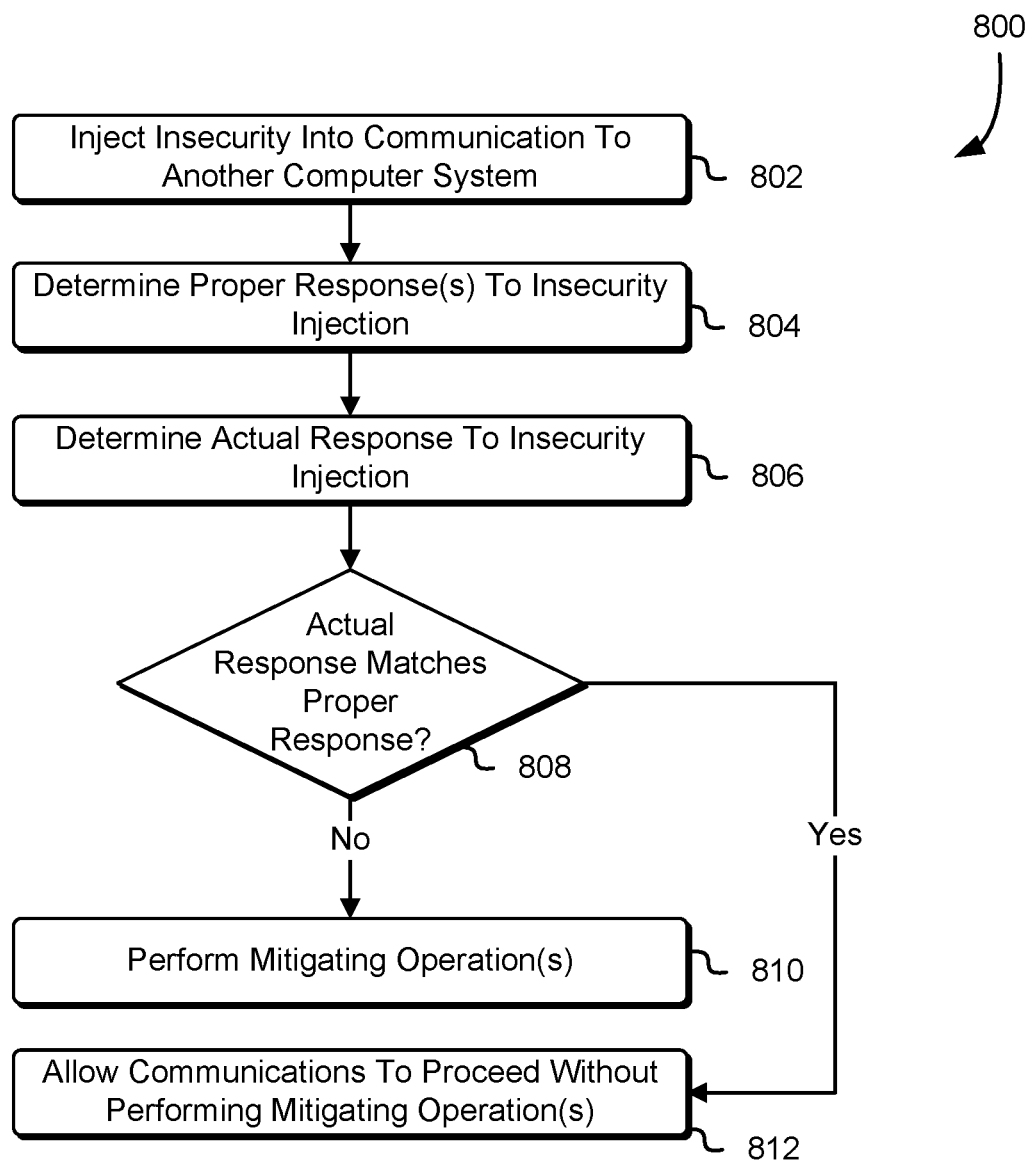
FIG. 8 shows an illustrative example of a process for testing another computer system in accordance with an embodiment.

FIG. 8 shows an illustrative example of a process 800 for testing another computer system in accordance with an embodiment. The process 800 may be performed by any suitable system, such as the computer system 704 described above in connection with FIG. 7. The system performing the process 800, for example, may perform the process 800 as a result of executing the injection module 712 and remediation module 714 described above. In an embodiment, the process 800 includes injecting 802 insecurity into a communication to another computer system. The insecurity that is injected 802 may be, for example, a modification to a communication that was generated in accordance with another application being executed by the system performing the process 800. As another example, a new message may be generated and transmitted to the other computer system.

A set of proper responses to the insecurity injection may be determined, such as described above. The process 800 may also include determining 806 an actual response to the insecurity injection by the other computer system. The actual response may be determined in various ways in accordance with various embodiments, such as described above. For example, in some embodiments a communication from the other computer system may indicate an actual response to the insecurity injection which may be a lack of response, such as when a TLS handshake is allowed to complete despite one or more errors introduced into a communication as part of the handshake that, with the proper implementation, would have caused the handshake to fail. The actual response may be determined 806 in other ways. For example, in some embodiments a proper response is to cease communications to the system that originated the message into which insecurity was injected. Accordingly, an actual response may be determined by a lack of additional messages received from the other computer system.

A determination may be made 808 whether the actual response matches a proper response that was determined 804. If it is determined 808 that the actual response does not match a proper response of the set of proper responses that was determined 804, the process 800 may include performing 810 one or more mitigating operations, such as described above. If it is determined 808 that the actual response does not match a proper response from the set of proper responses that was determined 804, the process 800 may include allowing communications to proceed without performing any mitigating operations. That process 800 may include allowing 812 communication to proceed without performing any mitigating operations that would have been performed had it been determined 808 that the actual response does not match a proper response from the set of proper responses that was determined 804.

Numerous variations of the processes described herein are considered as being within the scope of the present disclosure. For example, flowcharts shown in the figures show an example order of operations. Unless otherwise clear from context (e.g., because one operation depends on the performance of another operation), operations may be performed in a different order than illustrated. Similarly, processes may be modified in accordance with various embodiments to utilize fewer operations or a greater number of operations.

Embodiments of the present disclosure utilize communications protocols that utilize symmetric and/or asymmetric cryptographic primitives (algorithms). Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2, and Bcrypt. Asymmetric key algorithms may also include various schemes for performing cryptographic operations on data. Example algorithms include those that utilize the Diffie-Hellman key exchange protocol (an example cryptographic key exchange process), the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

Example, cryptographic algorithms include block ciphers and the various modes that utilize initialization vectors, such as the cipher-block chaining (CBC) mode, propagating cipher-block chaining (PCBC) mode, cipher feedback mode (CFB), output feedback (OFB) mode, counter (CTR) mode, and other modes, such as authenticated encryption modes including eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, and Galois/Counter (GCM) mode.

The techniques of the present disclosure may include the addition of and/or modification of messages generated in accordance with one or more cryptographic primitives, such as described above, such that the additional/modified messages include information replacing the output of one or more cryptographic primitives where the information is not valid output of one of the cryptographic primitives. Information may be invalid as output of a cryptographic primitive, for example, the information differs from the output that was generated by correct performance of the cryptographic primitive. The information may differ by value, format, and/or size. Example information may replace a fingerprint, checksum, encrypted message, certificate, and other output of one or more cryptographic primitives, such as described above.

Further, while the techniques described above are, for the purpose of illustration, focused on network communications, the techniques may be adapted to other contexts. For instance, insecurity may be injected into other types of communications, such as communications between processes of a computer system. Such techniques may be used, for example, to enable one application to test the operation of another application with respect to its response to insecurity injected into communications. Generally, communication channels do not necessarily require a network. Further, with respect to network communications, a network may be at least partially a virtual network and, in some examples, a communication may traverse a network without leaving a hardware computing device (e.g., when a communication is between two virtual computer systems implemented by the same hardware device). In addition, while network communications protocols (e.g., TLS) are used for the purpose of illustration, the techniques of the present disclosure may be used in connection with other protocols, such as protocols for utilizing an application programming interface (API) and, generally, any set of specifications for communications.

Further, the present disclosure, for the purpose of illustration, focuses on algorithms where an entity (e.g., computer system or application) is tested, at least in part, by determining whether the computer system failed to respond to an insecurity injection in a particular manner. However, the techniques described above are applicable to other ways of testing, such as by determining whether the entity being tested responds in a manner identified as insecure (rather than failing to respond in a manner identified as secure). Further, techniques for testing may include determining whether the entity being tested either failed to perform a predetermined secure response or performed a predetermined insecure response or in another way that indicates an addressable insecurity in the entity's operation. In other words, the response of the entity being tested may depend on what operations the entity performed, what operations the entity did not perform, or both. Other variations are also considered as being within the scope of the present disclosure.

Figure 9:
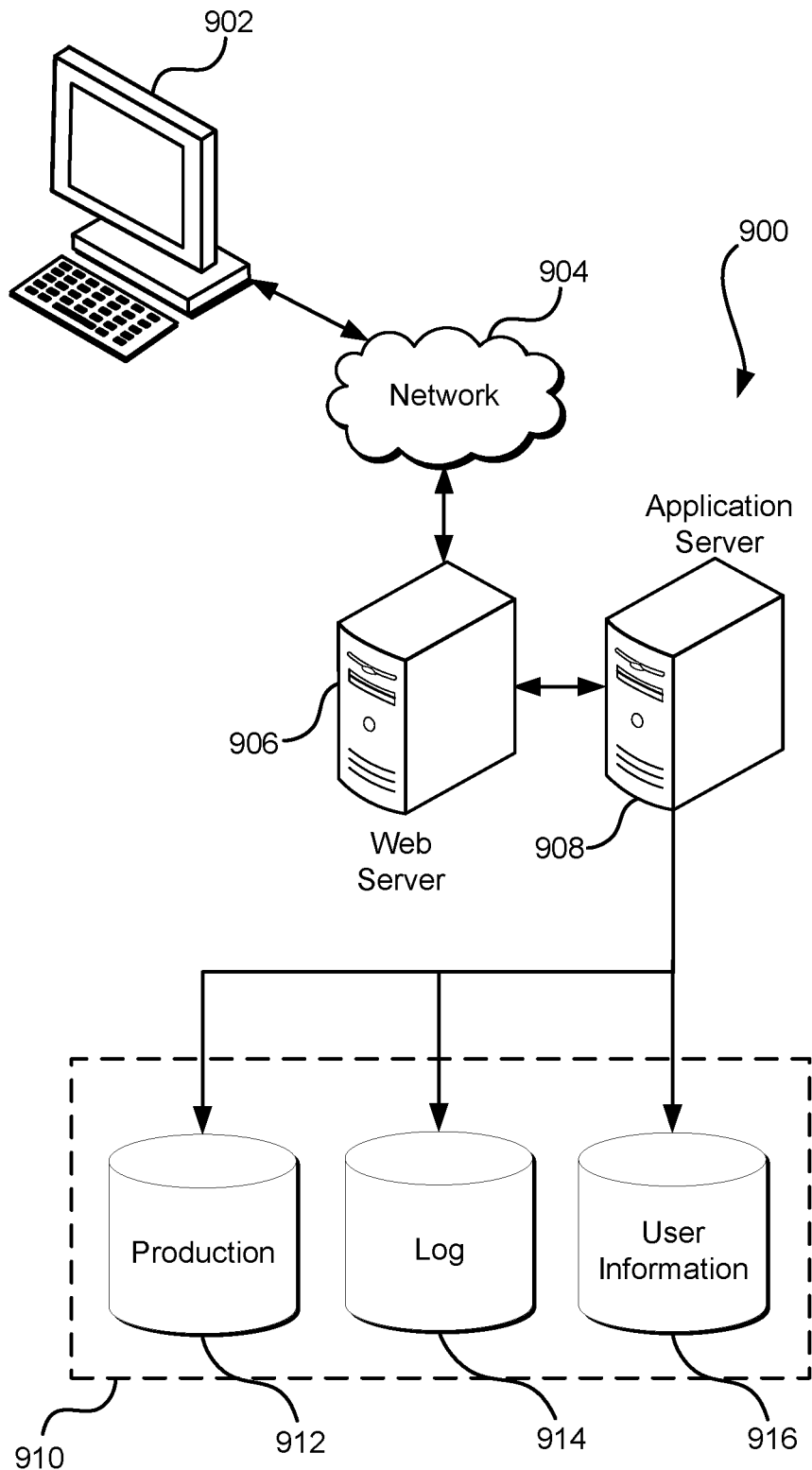
FIG. 9 shows an illustrative example of an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software and firmware for integrating with the data store as needed to execute aspects of one or more applications for the client device, handling some or all of the data access, and business logic for an application. The application server may provide access control services in cooperation with the data store and is able to generate content including, but not limited to, text, graphics, audio, video, and/or other content usable to be provided to the user, which may be served to the user by the web server in the form of Hypertext Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the electronic client device 902 and the application server 908, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes, and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the electronic client device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the example environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    selecting, from a plurality of computer systems in a distributed computing environment, a first computer system for testing; and
    asynchronous to other communications of the first computer system:
        intercepting information sent from a second computer system to the first computer system;
        testing the first computer system by:
            modifying, to be noncompliant with a communication protocol, the information to produce noncompliant information; and
            making a determination that the first computer system has failed to provide a particular response to the noncompliant information; and
        performing an operation based at least in part on the determination.

2. The computer-implemented method of claim 1, wherein modifying the information includes modifying cryptographic information in the information to produce the noncompliant information.

3. The computer-implemented method of claim 1, wherein modifying the information includes changing a digital certificate to be an invalid certificate.

4. The computer-implemented method of claim 1, wherein the operation includes one or more of:
    indicating that the first computer system should be audited,
    preventing password information from the second computer system from being sent to the first computer system,
    requiring additional security confirmations before providing the password information to the first computer system, or
    adding the first computer system to a blacklist.

5. The computer-implemented method of claim 1, wherein:
    the second computer system is a server of an electronic commerce entity;
    the first computer system is associated with a customer of the electronic commerce entity; and
    the operation performed is one or more of:
        limiting an amount that the customer is allowed to purchase over a time period,
        reducing a number of payment methods available to the customer, or
        limiting a number of shipping destinations allowed for the customer.

6. The computer-implemented method of claim 1, wherein:
    the first computer system is a server of an electronic commerce entity;
    the second computer system is associated with a customer of the electronic commerce entity; and
    the operation performed is one or more of:
        limiting an ability of a browser application of the customer to access a web page hosted by the first computer system, or
        disabling a control in a web interface hosted by the first computer system.

7. The computer-implemented method of claim 1, wherein the communication protocol is one of a Transport Layer Security protocol or a Secure Sockets Layer protocol.

8. A system, comprising:
    at least one computing device configured to implement one or more services, the one or more services configured to:
        select a first computer for testing;
        intercept, asynchronously to other communications of the first computer system, information sent from a second computer system to the first computer;
        test the first computer by causing the one or more services to:
            modify, to be noncompliant with a communication protocol, the information to produce noncompliant information; and
            make a determination whether the first computer has failed to provide a particular response to receipt of the noncompliant information; and
        perform an operation based at least in part on the determination.

9. The system of claim 8, wherein the communication protocol is one of a Transport Layer Security protocol or a Secure Sockets Layer protocol.

10. The system of claim 8, wherein:
    the determination indicates that a response provided by the first computer matches the particular response; and
    the operation includes adding the first computer to a temporary whitelist.

11. The system of claim 8, wherein the information:
    includes cryptographic information; and
    is included in a handshake process to establish a secure communications channel.

12. The system of claim 11, wherein the one or more services that cause the system to modify the information cause the system to modify the cryptographic information to be invalid.

13. The system of claim 11, wherein the communication protocol specifies the particular response for determinations of invalid cryptographic information.

14. The system of claim 13, wherein the one or more services that cause the system to make the determination further cause the system to determine that the first computer failed to implement the particular response.

15. A non-transitory computer-readable storage medium that stores executable instructions which, as a result of being executed by one or more processors of a computer system, cause the computer system to at least:
   select, for testing, a first computing device of a distributed computing system;
   obtain information sent from a second computing device to the first computing device;
   test, asynchronously to other communications of the first computer system, the first computing device by causing the computer system to:
      modify, to be noncompliant with a communication protocol, the information to produce noncompliant information; and
      make a determination whether the first computing device has failed to provide a particular response to receipt of the noncompliant information; and
   perform an operation based at least in part on the determination.

16. The non-transitory computer-readable storage medium of claim 15, wherein the executable instructions that cause the computer system to make the determination include instructions that cause the computer system to:
   determine, based at least in part on a communication specification, a proper response to receipt of the noncompliant information; and
   determine whether the first computing device responds in accordance with the proper response.

17. The non-transitory computer-readable storage medium of claim 15, wherein:
   the executable instructions comprise a portion of a network firewall application; and
   the network firewall application, as a result of being executed by the one or more processors, causes the computer system select the first computing device based at least in part on an attempt by the second computing device to communicate to the first computing device through a firewall.

18. The non-transitory computer-readable storage medium of claim 15, wherein:
   the executable instructions that cause the computer system to test the first computing device further include instructions that cause the computer system to:
      provide the noncompliant information to the first computing device; and
      obtain a response from the first computing device; and
   the executable instructions that cause the computer system to make the determination include instructions that cause the computer system to determine whether the response matches the particular response.

19. The non-transitory computer-readable storage medium of claim 15, wherein the executable instructions cause the computer system to select the first computing device include instructions that cause the computer system to randomly select the first computing device from a plurality of computing devices of the distributed computing system.

20. The non-transitory computer-readable storage medium of claim 15, wherein the computer system is the second computing device.

* * * * *